(12) United States Patent
Van Baal et al.

(10) Patent No.: US 7,111,442 B1
(45) Date of Patent: Sep. 26, 2006

(54) FLEXIBLE CONTAINER MADE OF FILM MATERIAL AND FILLING METHOD FOR FILLING SUCH A CONTAINER WITH A FLUID SUBSTANCE

(75) Inventors: Patrick Michael Van Baal, Amsterdam (NL); Erwin Heesemans, Gouda (NL); Manfred Hoek, Rotterdam (NL); Ronald Marius Johannes Albertus Van Der Klaauw, Voorhout (NL); Cor Kuyvenhoven, Leiden (NL); Henricus Willibrordus Wilhelmus Mensen, Leiden (NL); Manon Elisabeth Hendrika Snijders, Leiderdorp (NL); Piet-Hein Willem Timp, Heemstede (NL)

(73) Assignee: Heineken Technical Services B.V., Zoeterwoude (NL)

( * ) Notice: Subject to any disclaimer, the term of this patent is extended or adjusted under 35 U.S.C. 154(b) by 0 days.

(21) Appl. No.: 10/019,560

(22) PCT Filed: Jun. 29, 2000

(86) PCT No.: PCT/NL00/00456

§ 371 (c)(1),
(2), (4) Date: Apr. 29, 2002

(87) PCT Pub. No.: WO01/00502

PCT Pub. Date: Jan. 4, 2001

(30) Foreign Application Priority Data

Jun. 29, 1999 (NL) .................................... 1012474

(51) Int. Cl.
*B65B 3/04* (2006.01)
*B65B 3/26* (2006.01)

(52) U.S. Cl. .......................... 53/473; 53/170; 53/175; 53/266.1; 53/284.7

(58) Field of Classification Search ............... 141/114, 141/313, 314, 316; 53/449, 473, 170, 175, 53/266.1, 284.7, 499; 220/495.06, 459.01, 220/439.01
See application file for complete search history.

(56) References Cited

U.S. PATENT DOCUMENTS 2,338,604 A * 1/1944 Silveyra ................... 229/117.3
3,143,249 A * 8/1964 Merrill ....................... 222/105

(Continued)

*Primary Examiner*—Stephen F. Gerrity
*Assistant Examiner*—Gloria R. Weeks
(74) *Attorney, Agent, or Firm*—Sughrue Mion, PLLC

(57) ABSTRACT

The application relates to a flexible container (3) made of film material for containing drinks, comprising a fin opening as well as film storage means which delimit a first compartment and a second compartment (17, 18, 19) of the container and which release a second compartment (18, 19) when a predetermined degree of filling of the first compartment (17) is reached. By means of the film storage means, which, for example, can be formed by folding the side strips (20, 21) double in the longitudinal direction and holding them in place with the aid of adhesive tape, adhesive or fusion welding of the film material, uniform filling of the first compartment can be obtained, the flexible container largely remaining out of contact with the walls of the surrounding outer container. When the first compartment (17) has been filled the film storage means are released by the increase in the fill pressure and the second compartment (18, 19) can be filled so that uniform contact of the flexible container with the wall of the outer, rigid container is obtained. Using the flexible container and using the filling method according to the present invention high fill rates can be achieved and stresses are prevented from becoming too high in certain sections of the flexible container.

4 Claims, 5 Drawing Sheets

U.S. PATENT DOCUMENTS

| | | | |
|---|---|---|---|
| 3,377,766 A | * | 4/1968 | Nelson .................... 53/449 |
| 4,450,180 A | * | 5/1984 | Watkins .................. 426/107 |
| 4,586,628 A | * | 5/1986 | Nittel .................... 220/62.21 |
| 4,786,192 A | * | 11/1988 | Graves et al. ........... 383/119 |
| 4,898,301 A | * | 2/1990 | Schick .................. 229/117.27 |
| 4,955,512 A | * | 9/1990 | Sharples ................ 222/386.5 |
| 4,984,713 A | * | 1/1991 | Chambers et al. ........ 222/105 |
| 5,344,048 A | * | 9/1994 | Bonerb .................... 222/105 |
| 5,698,056 A | * | 12/1997 | Kamiyama et al. ...... 156/218 |
| 6,032,818 A | * | 3/2000 | Olson .................. 224/495.06 |

\* cited by examiner

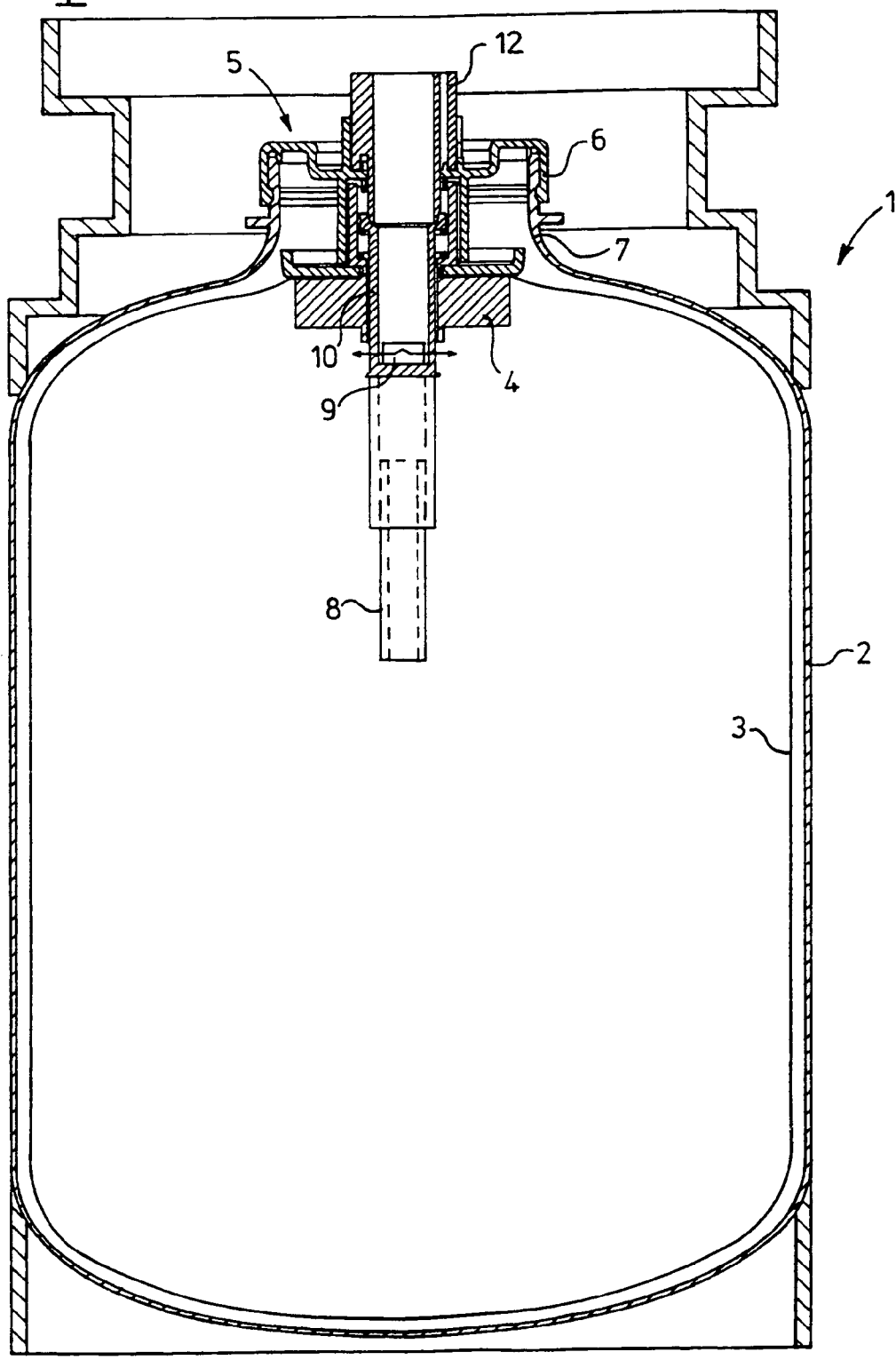

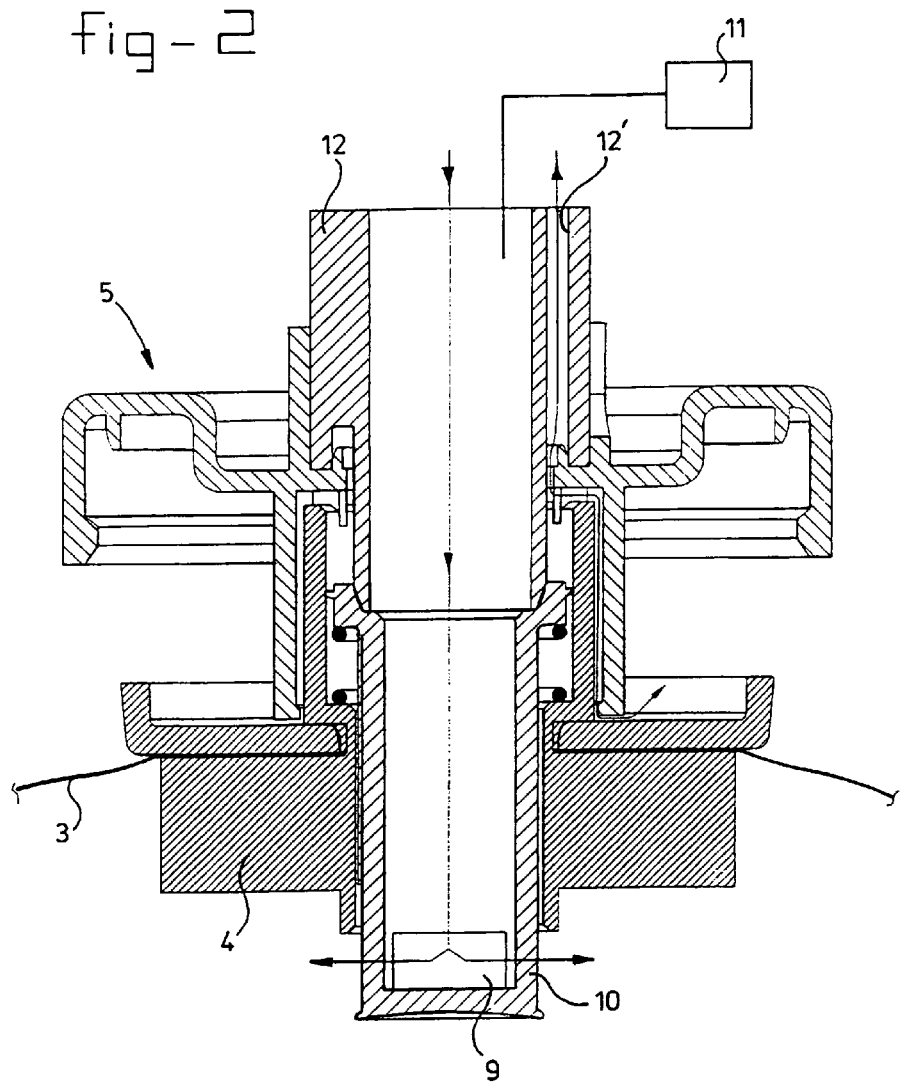

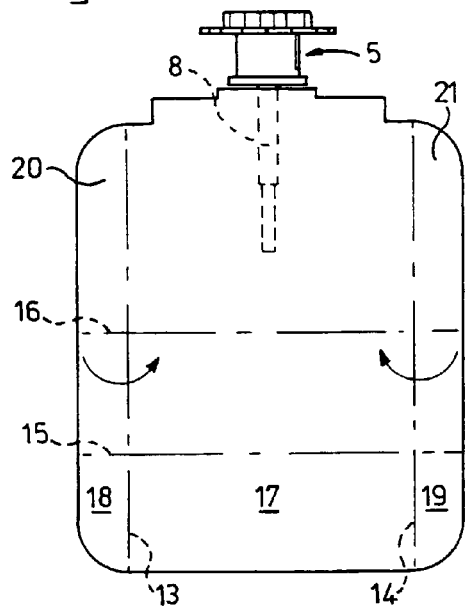
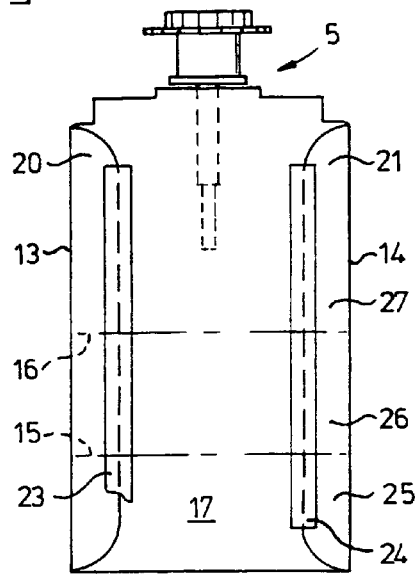
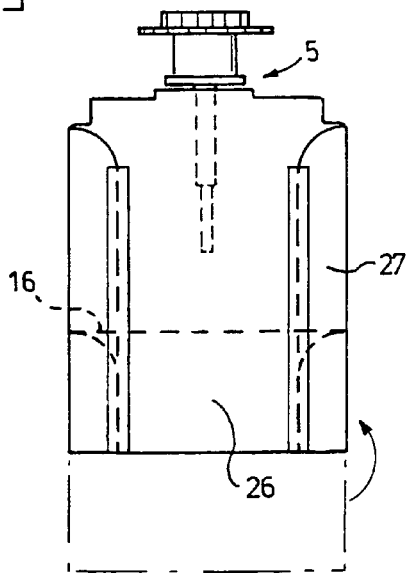
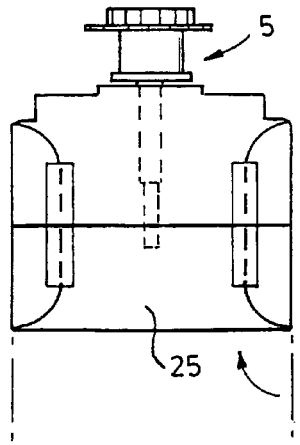

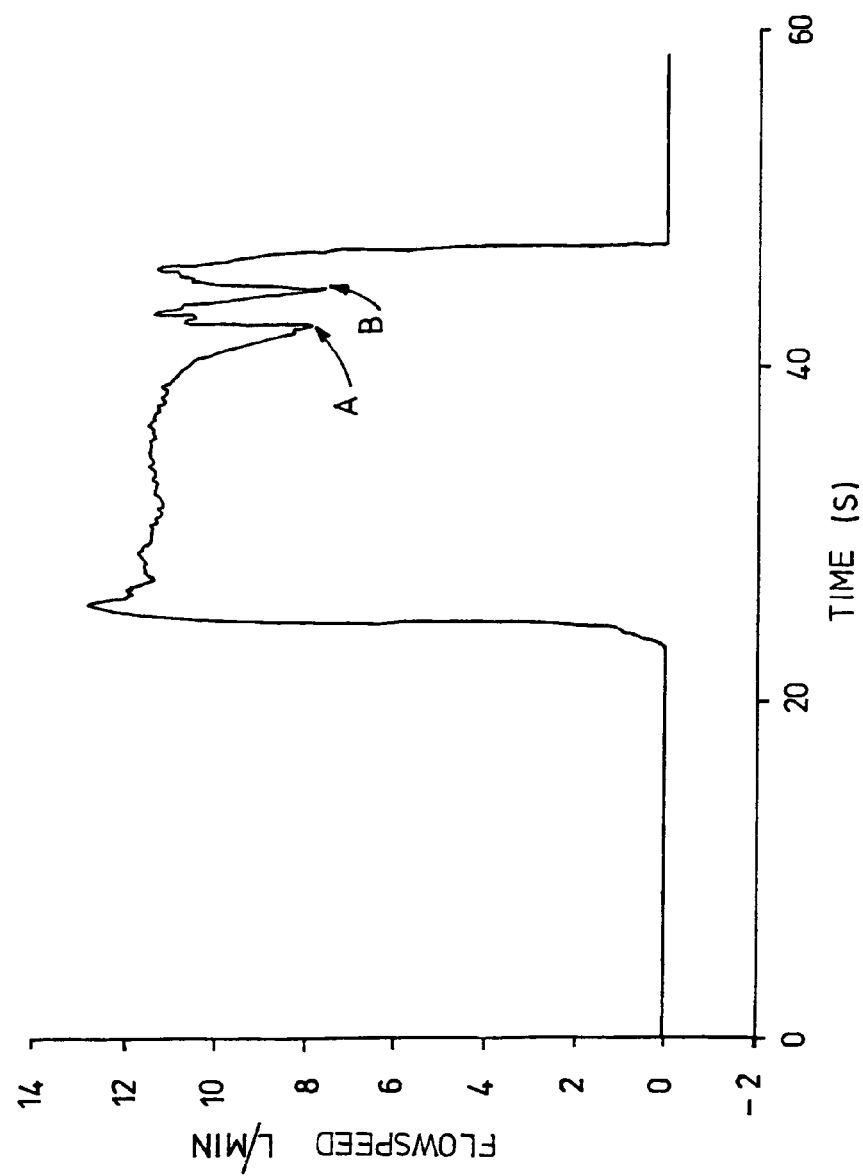

FLEXIBLE CONTAINER MADE OF FILM MATERIAL AND FILLING METHOD FOR FILLING SUCH A CONTAINER WITH A FLUID SUBSTANCE

The invention relates to a flexible container made of film material for containing a fluid substance comprising a fill opening and a partitioning means along which a first container wall part is placed against a second container wall part, the partitioning means dividing the container in a first and a second compartment, and to a filling method for filling such a container.

A flexible container for containing carbonated drinks, such as beer, is disclosed in Netherlands Patent Application no. 1 009 654, filed on 15 Jul. 1998 in the name of the Applicant. The known flexible container, or bag, is made of film material and is provided with a dispenser tube located between the front and back layers of film and a plastic filler cap connected to said dispenser tube. After the flexible container has been introduced in the rolled-up state into a relatively rigid outer container, the drink, such as, for example, beer, can be introduced into the flexible container via the filler cap. The flexible container unfolds until it is in contact with the inside wall of the rigid container. After filling, a dispensing line can be connected to the filler cap by the user (consumer) and the drink can be dispensed from the bag by applying an overpressure within the rigid container.

To prevent the bag filled with drink being damaged during use or transport it is important that when it is completely filled this bag is in close contact with the inside wall of the rigid container. It has been found when filling the bag that, under the influence of gravity, the lowest parts of the bag fill more rapidly than other parts and become trapped prematurely in contact with the inside wall of the rigid container. As a result the bag is not able to unfold in the desired uniform manner and high stresses can be generated. This can be problematical in particular in the area where the bag is attached to the filler cap if the bag is filled in the upright position, in which case the highest point is formed by the filler cap. Furthermore, as a result of the non-uniform unfolding of the bag, shut-off areas can form, as a result of which the bag is not completely filled.

From WO97/34794 a flexible container according to the preamble of claim 1 is known in which a controlled unfolding of the flexible inner container and complete filling of the rigid outer container by the inner flexible bag is achieved by use of sealing of two corner parts forming lugs which upon filling conform to the parallellepipedum-shaped rigid outer container. In addition, especial folding pattern using a tube-shaped cover, which slights of the folded inner container upon filing causes a gradual unfolding and proper filling of the parallellepipedum-shaped outer container. By permanently sealing of parts of the flexible inner container, useful container material is lost. Furthermore, a very complex folding pattern is required including additional sleeve material for proper unfolding of the known flexible inner container.

It is therefore an aim of the present invention to provide a flexible container or bag and a method for the filling thereof with which uniform filling is possible without parts of the bag prematurely becoming trapped between the walls of the rigid outer container.

A further aim of the present invention is to provide a bag with which a high fill rate can be achieved and with which it can be easily established while filling whether the filling process meets predetermined quality requirements.

To this end the flexible container according to the invention is characterised in that the partitioning means comprises a restraining member which maintains a substantially fluid tight separation of the first and second compartment until a predetermined pressure is achieved in the first compartment, at which predetermined pressure the restraining member is released by the fill pressure for placing the first and second compartment in fluid communication.

As a result of dividing the flexible container into sub-compartments it is possible to achieve successive controlled and localised filling of each compartment and, consequently, uniform film distribution. With this arrangement the shape which the bag assumes during filling is no longer determined exclusively by gravity. After the first compartment, that, for example, can comprise a central cylindrical volume, has been filled, a pressure is built up therein such that the film storage means are released. As a result the access to the second compartment is opened up, so that this compartment is then able to fill with drink. It has been found that using the bag according to the present invention uniform filling of the bag can be obtained at high fill rates, whilst at the same time uniform contact of the filled bag with the wall of the rigid, outer container can be obtained. As a result the bag is adequately supported during use and transport and the risk of damage is reduced.

In this application "fluid substance" means a substance with which a certain degree of flow is possible, such as a fluid, a paste or a granulate. The fluid can comprise a drink, for example a carbonated drink, such as beer. In this case a pressure of approximately 1 bar prevails in the bag during filling and a pressure of approximately 2 bar prevails in the rigid container. The paste can be a food product, such as tomato puree, or any other paste.

According to one variant of the present invention the restraining member can be formed by closure lines in the film material, such as, for example, fold lines or join lines along which the front and back film layers of the bag are joined to one another. According to another variant the restraining member is acting on a part of the container that has been tucked inside itself from an upper end or lower end or from the longitudinal edges.

In one embodiment which is to be preferred the restraining member comprise closure lines which essentially extend from the top to the bottom of the container, along which closure lines a front film layer of the container is essentially sealed in contact with the back film layer of the container. The closure lines can be formed by gluing or sealing the film layers, but are preferably formed in that the container has been folded double along the closure lines, a first layer of the film material folded double being attached via means offering resistance to a second layer of the film material folded double. The means offering resistance can be formed by adhesive between the folded film layers, sealing of the film layers or by adhesive tape. During filling the means offering resistance give way and controlled unfolding of the bag takes place, without contact with the wall and without accumulation of the fluid substance in the lower part of the bag, so that a uniform distribution of the film over the wall of the outer, rigid container will be obtained.

As a result of the controlled unfolding of the flexible container, not only are high fill rates (12 liters per minute or higher) obtained when filling the flexible container, but it is also possible to sample the fill pressure and/or flow rate during filling, for example with the aid of a computer, the fill pressure and/or flow rate changing when one sub-compartment unfolds. By detecting a change in the fill pressure and/or flow rate it can be ascertained with certainty that all sub-compartments of the flexible container have unfolded, this enabling simple quality monitoring.

A few embodiments of a flexible container and a filling method according to the present invention will be explained in more detail with reference to the appended drawing. In the drawing:

FIG. 1 shows a longitudinal section of a bag according to the present invention provided with a filler cap, accommodated in a relatively rigid outer container;

FIG. 2 shows a detail of the filler cap attached to the bag during the filling process;

FIGS. 3–6 show various stages in the folding of a bag according to the invention;

FIG. 10 shows a graph of the flow rate of the fluid (beer) when filling.

Figure 7:
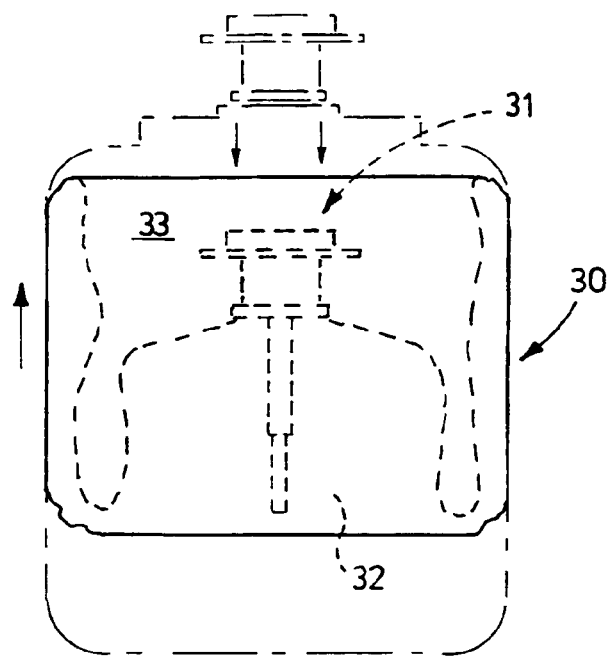
FIGS. 7 and 8 show side views of two alternative embodiments of restraining members according to the present invention incorporating folding, respectively, an upper end and a lower end of the bag inwards.

FIG. 1 shows an assembly 1 of a relatively rigid outer container 2 with a flexible container, or bag, 3 accommodated therein. The bag 3 is fixed in a sealed manner at an upper end to a fixing lip 4 which forms part of a plastic filler cap 5. The filler cap 5 is attached to a neck 7 of the rigid outer container 2 via an annular shoulder 6 such that it is clamped. The filler cap 5 is further connected to a dispenser tube 8 which extends into the flexible bag 3 to prevent the front and back walls coming into contact with one another. A fill opening 9 in the filler cap 5 is closed off. The fill opening 9 is made in the end of a shut-off valve 10 resiliently accommodated in the filler cap 5. The fill opening 9 is exposed by placing a filler tube 12 from a filling installation on the shut-off valve 10 and pushing the latter downwards, as is shown in FIG. 2.

FIG. 2 shows an enlarged view of the filler cap 5 of the flexible bag 3 and shows how fluid can be introduced into the bag 3 via the filler tube 12 by pushing down the shut-off valve 10. During this operation air is able to escape from the space located between the bag 3 and the outer container 2 via ventilation passage 12' in filler tube 12. Furthermore, an internal pressure of, for example, 2 bar can be applied in the outer container 2 via the vent opening 12', for a fill pressure in the bag 3 of approximately 1 bar if the fluid is beer. In the filled state virtually the entire outer surface of the bag 3 is in contact with the wall of the outer container 2.

A recording device for measuring the flow rate and/or the pressure in the filler tube 12 is shown diagrammatically by 11. The device 11 can be a flow sensor or pressure sensor which is connected to a personal computer.

To prevent some parts of the bag 3 prematurely becoming trapped in engagement with the wall of the outer container 2 during filling, a fold pattern has been made in the bag in the embodiment according to FIGS. 3 to 6.

FIG. 3 shows a side view of the bag 3 in its flat state, in which state air has been removed from the bag via the filler cap 5 and the dispenser tube 8 so that the bag is completely flat. The bag 3 has been made from a multilayer film which, for example, comprises an aluminium-polyethene laminate with a thickness of approximately 70 µm to 100 µm. In the embodiment according to FIG. 3 four fold lines 13, 14, 15 and 16 are indicated, along which the film material is folded. A first central compartment 17 of the bag 3 and two side compartments 18, 19 are formed by the vertical fold lines 13 and 14. By folding the side strips 20, 21 over along the fold lines 13, 14, sealing lines are formed along the fold lines 13, 14, so that the fluid introduced into the central compartment 17 through the filler cap 5 is not able to enter the side compartments 18, 19. As shown in FIG. 4, the folded-over side strips 20, 21 are held in place by adhesive tapes 23, 24 applied along the free edges thereof. The bottom section 25 in FIG. 4 is then folded backwards out of the plane of the drawing along the fold line 15, against the mid section 26. In FIG. 5 the mid section 26 is folded forwards out of the plane of the drawing along the fold line 16, against the top section 27, so that the configuration according to FIG. 6 is obtained. The bag 3 folded in accordance with FIG. 6 is rolled up so that it can be introduced through the neck 7 of the outer container 2. A filler tube 12 is then connected to the filler cap 5 and the bag 3 unfolds during filling, first in the longitudinal direction to give the configuration which is shown in FIG. 4. The central compartment 17 is then first of all filled with fluid from the bottom up to the dispenser tube 8, the side strips 20, 21, which are held in place by the adhesive tapes 23, 24, being prevented from engaging on the wall of the outer container 2. After the central compartment 17 has been filled and the film has been distributed in the longitudinal direction over the entire height of the outer container, the pressure therein will rise up to a value at which the adhesive tapes 23, 24 detach or tear, so that the compartments 18 and 19 are released and are then able to fill with fluid.

In this way relatively high fill rates, such as, for example, 12 liters per minute, can be obtained and a uniform increase in volume of the bag 3 is achieved without stresses becoming too high, in particular on the fixing lip 4 of the filler cap 5. What is achieved by means of the uniform filling of the bag 3 in accordance with the method described above is that the bag 3 comes uniformly into contact with the outer container 2, so that the bag 3 is adequately supported when filled and is protected against damage.

For thicker films, which because of their stiffness unfold under higher pressures, the adhesive strength of the adhesive tapes 23, 24 has to be higher and stronger adhesive tapes have to be used.

Alternative film storage means for forming different compartments 17, 18 and 19 in accordance with FIGS. 3 to 6 will be obvious to those skilled in the art. For instance, the adhesive tapes 23, 24 can, for example, be replaced by adhesive or fusion welding of the film material. It is also possible to fuse the front and back layers of film material of the bag 3 to one another in the flat state, as shown in FIG. 3, along interrupted or uninterrupted vertical lines 13, 14 with a strength such that when the central compartment 17 has been filled the fusion seals 13, 14 give way under the pressure and release the side compartments 18, 19.

It is also possible to provide the bag with elastic in the transverse direction or to place the bag in an elastic jacket or sleeve.

Figure 8:
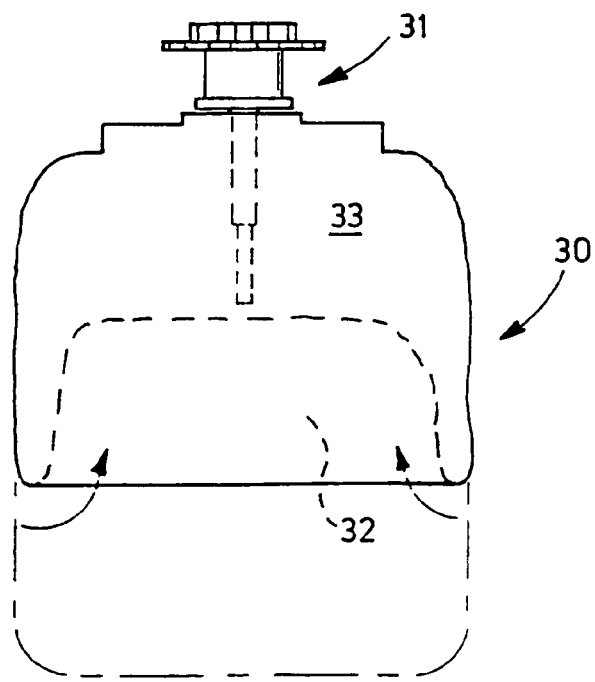

Alternative embodiments of film storage means for uniform unfolding of a bag 30 having a filler cap 31 are shown in FIGS. 7 and 8. In this case the upper and the lower section 32, respectively, of the bag 30 has been turned "inside out" so that the section 32 is located between a front and back layer of film material of the top or bottom compartment 33. In FIG. 7 the upper compartment 32 will be expelled upwards on filling, after which the lower compartment 33 is filled. In FIG. 8 the upper compartment 33 will be filled first when filling the bag 30, after which, when a predetermined fill pressure is reached, the lower compartment 32 will be expelled downwards until the lower compartment 32 has also filled.

Figure 9:
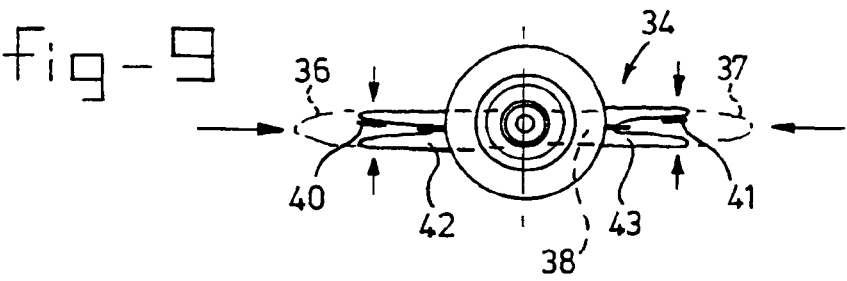
FIG. 9 shows a diagrammatic plan view of a restraining member incorporating folding the longitudinal sides of the bag inwards.

FIG. 9 shows a further alternative embodiment where the material of the bag 34 has been displaced from the side edges 36, 37 indicated by a broken line towards the centre line, so that side compartments 42, 43 and a central compartment 38 are obtained. The side compartments can be fixed in the folded position by glue points 40, 41. Depending on the flexibility of the bag 34, the glue points 40, 41 can also be omitted. After filling the central compartment 38 the parts 36, 37 folded double will be expelled outwards and the bag 34 will achieve the filled configuration.

In the case of the examples described above the bag 30, 34 has always been placed upright so that the filler cap 31, 38 forms the highest point. It is also possible to fill the bag according to the present invention in the upside-down position, so that the filler cap 31, 38 forms the lowest point, the same advantages as have been discussed above being obtained.

FIG. 10, finally, shows a graph of a flow rate determined using the device according to FIG. 2 against time when filling a bag of 4 liters capacity with beer, the fill pressure being 1 bar and the pressure inside the rigid container being 2 bar. The bag was folded in accordance with the pattern that is shown in FIGS. 3 to 6. On filling the central compartment 17 the flow rate, after having been essentially constant, decreases sharply to point A, after which the flow rate suddenly increases. This means that one of the adhesive tapes 23, 24 has detached and one of the side compartments 18 or 19 has been released. The second compartment is released at point B in the graph according to FIG. 10, after which the filling process is completed relatively quickly. In the case of a perfectly symmetrical configuration of the compartments, points A and B will be coincident. By detecting the point in time at which the side compartment unfolds by determining the pulse-like changes in the flow rate according to FIG. 10 it is possible to determine that the side compartments have unfolded and that, on the basis of this, the filling process has proceeded in accordance with specifications.

The invention claimed is:

1. Filling method for filling a flexible container with a fluid substance, comprising the following steps:
    placing the flexible container in a relatively rigid container, the flexible container being provided with a film material for containing a fluid substance comprising a fill opening and a partitioning means along the which a first container wall part is placed against a second container wall part, the partitioning means dividing the container in a first and second compartment, characterised in that the partitioning means comprises a restraining member which maintains a substantially fluid tight separation of the first and second compartment until a predetermined pressure is achieved in the first compartment, wherein at the predetermined pressure, the restraining member is released by the fill pressure for placing the first and second compartment in fluid communication;
    filling the first compartment with the fluid substance via a fill opening in the container,
    activating the film storage means via the fill pressure such that the second compartment is released, and
    filling the second compartment until the film material of the flexible container is at least largely in contact with the wall of the rigid container;
    wherein, during filling, at least one of a flow rate and a fill pressure is measured and a change in the at least one of the flow rate and the fill pressure is determined on activation of the film storage means.

2. Method according to claim 1, characterised in that air is removed from the flexible container before the flexible container is inserted in the rigid container.

3. Method according to claim 1, characterised in that the flexible container is folded double along closure lines, the container sections folded double being attached to one another by the restraining member which can be released by fill pressure.

4. The method according to claim 1, further comprising inserting said flexible container into a generally cylindrical, rigid outer container;
    wherein a central cylindrical area is defined between the closure lines;
    wherein upon filling and expanding the flexible container, vertical sides of the flexible container outside the closure lines do not press against the walls of the rigid outer container; and
    wherein after release of the closure lines, the flexible container material outside the closure lines is pressed into contact with the rigid outer container.

* * * * *